UNITED STATES PATENT OFFICE 2,502,446

PROCESS FOR PRODUCING SYNTHETIC RESINOUS MATERIAL FOR MOUNTING MICROSCOPIC SPECIMENS

William D. Fleming, Denver, Colo.

No Drawing. Application November 28, 1947, Serial No. 788,695

3 Claims. (Cl. 260—67)

(Granted under the act of March 3, 1883, as amended April 30, 1928; 370 O. G. 757)

The invention described herein may be manufactured and used by or for the Government for governmental purposes, without payment to me of any royalty thereon.

The present invention relates generally to an improved mounting material for histological, pathological, and bacteriological specimens, and more particularly, the invention is directed to a synthetic resin adapted to serve as a substitute for the natural resins such as Canada balsam and Singapore dammar, now generally used as a mounting material in the microscopic work.

One object of the present invention is to provide a synthetic mounting material of the character specified which, owing to its high refractive index, will impart a greater degree of transparency to the specimen on the slide, thus affording an increase in visibility, and, in consequence, a more comprehensive microscopic examination.

Another object of this invention is to produce a synthetic mounting material for microscopic studies, which has a very pale yellow color in mass, but which is colorless in thin layers, has good glass-adhering properties, and is inert with respect to microscopic stains.

Another object of the invention is to provide a synthetic and homogeneous resin of the type designated which is neutral, color stable, will not become acid with age, is more uniform in its properties than are the natural resins and which is readily soluble in benzene hydrocarbons.

A still further object of the invention is to provide a synthetic resin which may be prepared easily from abundantly available raw materials, and while resembling Canada balsam, has the advantage of a higher refractive index, paler color, and of being permanently neutral and non-reactive.

A still further object of the invention is to improve the process of preparation of the resin and of purification thereof over the process disclosed in United States Letters Patent No. 2,312,329, issued March 2, 1943 to the present applicant.

Briefly stated, the synthetic resin forming the subject matter of the present invention is prepared by reacting naphthalene with formaldehyde in the presence of suitable catalytic agents and under controlled temperature conditions, purifying the resultant resin to effect removal of undesirable by-products and residues, treating the purified resin with a plasticizer to render it less brittle, and if the refractive index of the resulting compound is too high, further treating it with a styrene polymerization product.

It may be pointed out that both Canada balsam and gum dammar, which are natural resins, are available on the market in lump form, but, if clean and free from debris are very expensive. Both of these resins yellow with age and are acidic. Moreover, under certain conditions of supply the available amounts of Canada balsam and gum dammar may be limited or completely discontinued, and therefore, a synthetic resin substitute having the requisite properties for microscopic work is highly desirable. It therefore is the aim and purpose of this invention to provide a substitute synthetic product which not only serves the purpose of Canada balsam and gum dammar but in many respects is superior to these resins, since it has a refractive index of N/D 1.67 and higher, as compared with N/D 1.535 for Canada balsam and N/D 1.542 for gum dammar. Moreover, the product of the present invention is permanently neutral, does not react with microscopic stains, and will not change color or become brittle with age.

For facilitating the discussion, the synthesis of the finished product from the raw material will be considered in the following order: production of crude resin, purification of the resin, plasticization and refraction index control.

Preparation of the resin

The slow reaction at reduced temperature described in the aforesaid United States Letters Patent has been improved by allowing the reaction to proceed with intermittent heating.

The process of the present invention is carried out specifically in the manner indicated below, the materials being mixed in the below-specified amounts or multiples thereof, and in order and in the procedure set forth below:

Cubic centimeters
(a) Glacial acetic acid_____ 300
   Concentrated sulphuric acid_____ 100

Chill each acid to substantially 10° C. Add the sulphuric acid to the acetic acid and chill the mixture to 10° C.

(b) Naphthalene _____gms__ 100
   Add to the above-chilled acid mixture.
(c) Formaldehyde, 37 per cent water solution _____cc__ 100
   Add to the above mixture of (a) and (b).

The resulting mixture is allowed to stand overnight at room temperature. It then is heated over a boiling water bath, at first intermittently, and then continuously until the resin which forms and rises to the top of the reaction mixture is brittle at room temperature. Throughout this process, the reaction mixture is shaken or stirred frequently.

When the resin has become brittle at room temperature, the reaction mixture is poured into a large volume of hot water. The crude resin which settles to the bottom is kneaded or puddled with several changes of hot water to remove the greater part of the acids and unreacted formaldehyde.

*Purification of the resin*

The crude resin is chilled to 10° C. or lower and ground in a chilled mortar with ice water. The finer suspension of resin is poured off periodically onto a suction filter, and the grinding of the coarser particles with ice water is continued until all resin is transferred to the filter as a very fine powder. The powder is washed with water, sucked dry, and thrown into boiling water. The powder is stirred until well conglomerated, removed and chilled as before. This cycle of chilling, grinding, washing, and filtering, is repeated three times. Finally the resin is ground with twice its volume of cold alcohol and collected on a suction filter. The resulting powder is sucked dry, air dried, and finally dried overnight in an oven heated to about 56° C.

The further purification of the resin is effected in accordance with the present process in three steps, as will be set forth below:

1. The crude resin is chilled to 10° C., or lower, and ground in a chilled mortar with ice water. The finer suspension of resin is poured off periodically onto a suction filter, and the grinding of the coarser particles with ice water is continued until all resin is transferred to the filter as a very fine powder. The powder is washed with water, sucked dry, and thrown into boiling water. The powder is stirred until well conglomerated, removed and chilled as before. This cycle of chilling, grinding, washing, and filtering is repeated as many times as may be necessary, three times being usually satisfactory. Finally the resin is ground with twice its volume of cold alcohol and collected on a suction filter. The resulting powder is sucked dry, air dried, and finally dried overnight in an oven heated to about 56° C.

2. The purification described in (1) above removes acid and unreacted formaldehyde. There remain certain by-products which interfere with the desired use of the resin by crystallizing out in the microscope mount. In the process described in the aforesaid Letters Patent, these by-products were removed at least partially by dissolving the resin to a dilute solution in xylene and filtering. It was then necessary to concentrate the resin by evaporating off the xylene, which procedure is troublesome and expensive and in some cases did not give complete purification.

In accordance with the present improved process, purification is effected by using acetone as a differential solvent which dissolves the desired resin without dissolving the by-products. Furthermore, it has been found that the resin dissolves in acetone with a high temperature coefficient so that a relatively small volume of acetone is sufficient for the process.

Therefore, the dried resin from (1) above is powdered and placed in twice its volume of acetone and heated on a water bath. Solution is aided by stirring. The hot solution is decanted from any residue onto a fluted filter. The filtrate is chilled to 10° C., or below, and the liquid decanted from the deposited resin back onto the original undissolved resin. The process is repeated until all the acetone-soluble resin is filtered into the receiving flask. An equal volume of water is added and the flask heated on a water bath until the most of the acetone is evaporated. The flask then is cooled and the water poured off the resin. This removes the last trace of acid.

3. The resin then is mixed twice with small amounts of alcohol. Repeated extraction with hot acetone then is repeated as in (2) above.

The resulting resin and acetone are heated on a water bath until the acetone has been reduced to half volume. An equal amount of alcohol is added and the mixture again evaporated on the water bath to half volume. It then is chilled and the liquid decanted from the solid resin. The resin then is heated on the water bath until no odor of acetone or alcohol is evident, and then is heated on a hot plate at not above 150° C. until clear and brittle at room temperature. It then is ready to be dissolved and plasticized as set forth in the aforesaid Letters Patent.

The resin thus obtained has, in xylene solution, a very pale yellow color with no trace of red or fluorescence. When a thin layer of this solution is placed on a slide and dried for two days at a temperature of 100° C. the resin becomes hard and brittle but its pale yellow color remains constant.

The refractive index of a sample in which enough xylene remained to soften the resin sufficiently to permit closing the refractometer prism was N/D 1.67. With a further loss of xylene, the refractive index becomes even greater.

*Plasticization and refraction index control*

These steps are carried out as described in the aforesaid United States Letters Patent No. 2,312,329.

By proceeding in accordance with the process of the present invention, there is provided a quicker and more convenient process for synthesizing the crude resin, coupled with a more thorough, complete, and more economical procedure for purifying the crude resin than the process disclosed in the aforesaid Letters Patent, and the present improved process gives a more thorough and complete separation of the resin from undesired by-products and impurities. The present improved procedure using acetone as a differential solvent produces, as an end product, a resin having properties for the desired use that are superior to the product of the original method described in the aforesaid Letters Patent.

Having thus described my invention, what I claim as new and wish to secure by Letters Patent is:

1. A process for producing a synthetic resin adapted for use as a mounting for microscopic media, which comprises reacting naphthalene and formaldehyde in the presence of an acid catalyst by adding naphthalene and formaldehyde to a chilled acid catalyst, heating the resulting mixture on a boiling water bath at first intermittently and then continuously until the resulting resin becomes brittle at room temperature, pouring the resulting resin and reaction mixture into hot water, washing the resin with successive portions of hot water to remove residual acids and unreacted formaldehyde, and purifying the resulting resin by chilling the resin, grinding the chilled resin in cold water, filtering off the resulting powdered resin, introducing the resin into boiling water to agglomerate the resin, chilling the agglomerated resin, repeating the cycle of chilling, grinding, washing, and filtering until the resin is free from all water-soluble constituents, grinding the resulting resin in cold alcohol, collecting and drying the alcohol-washed resin, and further purifying the resin by extraction with hot acetone until the resin becomes substantially free from undesired by-products, filtering the resulting hot acetone solution to free it from undissolved solid materials, and chilling the resulting filtered solution to precipitate the resin dissolved therein.

2. A process of producing a synthetic resin suitable for use as a mounting material for microscopic media, which comprises first preparing an acid catalyst by mixing cold glacial acetic acid and cold concentrated sulphuric acid in the ratio of substantially 300 cc. of glacial acetic acid to substantially 100 cc. of concentrated sulphuric acid, adding naphthalene in proportion of 100 gms. to the resulting cold mixture and then adding a thirty-seven percent solution of formaldehyde in water in proportioned amount of 100 cc., allowing the resulting mixture to stand at room temperature until the reaction is initiated, then heating the mixture on a boiling water bath at first intermittently and then continuously until the resin which forms and rises to the top of the reaction mixture becomes brittle at room temperature, pouring the resulting resin and reaction mixture into a large volume of hot water, kneading the resin with several changes of hot water to remove the greater part of the acids and unreacted formaldehyde, chilling the resulting resin, triturating the chilled resin in successive portions of cold water until the resin becomes finely comminuted, recovering the resin as comminution proceeds, introducing the comminuted resin into hot water until the resin becomes conglomerated, regrinding the resin, chilling the ground resin, and washing the ground resin with cold water until water-soluble associated constituents are removed completely, further triturating the resulting water-washed resin in cold alcohol until alcohol-soluble constituents are removed, collecting and drying the resulting resin, and completing the purification of the resin by dissolving the resin in hot acetone, precipitating the resin from the acetone solution by chilling the solution until the resin separates, and repeating the dissolving in acetone and precipitating the resin from the acetone solution until complete purification is effected.

3. In the process of claim 1, the steps of completing the purification of the dried alcohol-washed resin by dissolving the resin in hot acetone, filtering the resulting solution from any undissolved residue, chilling the resulting filtrate until the dissolved resin precipitates, decanting the acetone from the precipitated resin back over the undissolved residue, repeating the precipitation and extraction of undissolved residue until all acetone-soluble resin is removed therefrom, adding an equal volume of water to the acetone-resin solution, heating the resulting mixture on a water bath until most of the acetone is evaporated, cooling the resulting water resin mixture, pouring off the water, and rinsing the resin with alcohol to remove all water therefrom.

WILLIAM D. FLEMING.

REFERENCES CITED

The following references are of record in the file of this patent:

UNITED STATES PATENTS

| Number | Name | Date |
|---|---|---|
| 898,307 | Bohn | Sept. 8, 1908 |
| 2,312,329 | Fleming | Mar. 2, 1943 |